(12) United States Patent
Maclachlan et al.

(10) Patent No.: US 10,493,437 B2
(45) Date of Patent: Dec. 3, 2019

(54) METHODS OF PREPARING METAL/METAL OXIDE MATERIALS FROM NANOSTRUCTURED SUBSTRATES AND USES THEREOF

(71) Applicant: THE UNIVERSITY OF BRITISH COLUMBIA, Vancouver (CA)

(72) Inventors: Mark Maclachlan, Vancouver (CA); Michael Wolf, Vancouver (CA); Gomathi Anandhanatarajan, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 15/121,598

(22) PCT Filed: Feb. 25, 2015

(86) PCT No.: PCT/CA2015/000118
§ 371 (c)(1),
(2) Date: Aug. 25, 2016

(87) PCT Pub. No.: WO2015/127538
PCT Pub. Date: Sep. 3, 2015

(65) Prior Publication Data
US 2016/0361707 A1    Dec. 15, 2016

Related U.S. Application Data

(60) Provisional application No. 61/944,876, filed on Feb. 26, 2014.

(51) Int. Cl.
*B01J 23/63*    (2006.01)
*B01J 35/00*    (2006.01)
(Continued)

(52) U.S. Cl.
CPC .......... *B01J 23/66* (2013.01); *B01D 53/8668* (2013.01); *B01D 53/94* (2013.01); *B01J 23/63* (2013.01);
(Continued)

(58) Field of Classification Search
CPC ... B01J 23/1056; B01J 23/66; B01D 2255/10; B01D 2255/40; B01D 2258/018; B01D 2258/0283; B01D 53/8668; B01D 53/94
See application file for complete search history.

(56) References Cited

U.S. PATENT DOCUMENTS 3,842,017 A     10/1974 Armistead et al.
2004/0176620 A1  9/2004 Kuperman et al.
(Continued)

FOREIGN PATENT DOCUMENTS

CN       1198365 A    11/1998
CN     101168447 A     4/2008
(Continued)

OTHER PUBLICATIONS

Machine translation of Shan (CN101168447), publication date Apr. 30th, 2008.*
(Continued)

*Primary Examiner* — Jun Li
(74) *Attorney, Agent, or Firm* — Knobbe, Martens, Olson & Bear, LLP

(57) ABSTRACT

A method of preparing a metal/metal oxide material can make use of a nanostructure that includes a first metal to form the metal oxide, and a reaction surface with a reducing agent on the reaction surface. A second metal is deposited onto the reaction surface to form a bimetallic product. The bimetallic product is calcined to form the metal/metal oxide material.

18 Claims, 11 Drawing Sheets

(51) Int. Cl.
| | | |
|---|---|---|
| B01D 53/94 | (2006.01) | |
| B01J 37/08 | (2006.01) | |
| B01D 53/86 | (2006.01) | |
| B01J 37/02 | (2006.01) | |
| B01J 23/66 | (2006.01) | |
| C01B 13/18 | (2006.01) | |
| B01J 35/10 | (2006.01) | |
| B82Y 30/00 | (2011.01) | |

(52) U.S. Cl.
CPC ....... *B01J 35/0013* (2013.01); *B01J 35/1014* (2013.01); *B01J 37/0201* (2013.01); *B01J 37/0225* (2013.01); *B01J 37/08* (2013.01); *C01B 13/18* (2013.01); *B01D 2255/40* (2013.01); *B01D 2257/7025* (2013.01); *B01D 2258/018* (2013.01); *B01D 2258/0283* (2013.01); *B82Y 30/00* (2013.01)

(56) References Cited

U.S. PATENT DOCUMENTS

| | | | | |
|---|---|---|---|---|
| 2005/0159306 | A1* | 7/2005 | Kezuka | B01J 21/063 502/350 |
| 2006/0233691 | A1* | 10/2006 | Vanderspurt | B01J 23/002 423/263 |
| 2008/0260607 | A1* | 10/2008 | Flytzani-Stephanopoulos | B01J 23/63 422/222 |
| 2011/0067315 | A1* | 3/2011 | Cho | B82Y 30/00 51/309 |
| 2013/0109600 | A1 | 5/2013 | Reed et al. | |
| 2013/0183221 | A1* | 7/2013 | Chen | B01J 23/894 423/247 |
| 2015/0057149 | A1* | 2/2015 | Yang | B01J 37/18 502/185 |
| 2016/0361707 | A1* | 12/2016 | Maclachlan | C01B 13/18 |

FOREIGN PATENT DOCUMENTS

| | | |
|---|---|---|
| CN | 102 658 137 A | 9/2012 |
| EP | 0 878 235 A1 | 11/1998 |
| GB | 1 538 330 A | 1/1979 |

OTHER PUBLICATIONS

Chen (Formation of CeO2 Nanotubes from Ce(OH)CO3 nanorods through Kirkendall Diffusion, Inorganic Chemistry 2009, 48, pp. 1334-1338).*

Zhang (In situ Loading of Ultrafine AuPd Particles on Ceria: Highly Active Catalyst for Solvent-free Selective Oxidation of Benzyl Alcohol, Langmuir, 2011, vol. 27 (3), p. 1152-1157).*

N. Uekawa, et al., "Synthesis of $CeO_2$ Spherical Fine Particles by Homogeneous Precipitation Method with Polyethylene Glycol," Chemistry Letters, May 2002, pp. 854-855.

Huey-Ing Chen, et al., "Homogeneous precipitation of cerium dioxide nanoparticles in alcohol/water mixed solvents," Colloids and Surfaces A: Physicochem. Eng. Aspects, Jun. 2004, vol. 242, pp. 61-69.

Hua Gu, et al., "Preparation and Characterization of Monodisperse Cerium Oxide Nanoparticles in Hydrocarbon Solvents," Chemical Materials, Feb. 13, 2007, vol. 19(3), No. 5, pp. 1103-1110.

C. Ho et al., "Morphology-Controllable Synthesis of Mesoporous $CeO_2$ Nano-and Microstructures," Chemical Materials, Jul. 22, 2005, vol. 17(17), pp. 4514-4522.

J.M. Campelo, et al., "Sustainable Preparation of Supported Metal Nanoparticles and Their Applications in Catalysis," ChemSusChem, 2009, vol. 2, pp. 18-45.

International Search Report mailed by Canadian Intellectual Property Office dated May 14, 2015 in the corresponding PCT patent application No. PCT/CA2015/000118—4 pages.

Supplementary European Search Report received in connection with European Patent Application No. 15 75 6012 dated Aug. 28, 2017.

Zhu, F., in situ Growth of $Au@CeO_2$Core-Shell Nanoparticles and $CeO_2$Nanotubes From $Ce(OH)CO_3$Nanorods, Journal of Materials Chemistry A: Materials for Energy and Sustainability 1(2):288-294, Oct. 2, 2012.

Zhong, L.-S., et al., 3D Flowerlike Ceria Micro/Nanocomposite Structure and Its Application for Water Treatment and CO Removal, Chemistry of Materials 19(7):1648-1655, Apr. 2007.

Colussi, S., et al., Nanofaceted Pd-O Sites in Pd-Ce Surface Superstructures: Enhanced Activity in Catalytic Combustion of Methane, Angewandte Chemie International Edition 48(45):8481-8484, Oct. 26, 2009.

He, L., et al., Solvothermal Synthesis and Characterization of Ceria With Solid and Hollow Spherical and Multilayered Morphologies, Applied Surface Science, vol. 322, pp. 147-154, Oct. 24, 2014.

Search Report received in connection with Chinese Patent Application No. 201580020938.2 dated Jun. 1, 2018.

Ho, C., Morphology-Controllable Synthesis of Mesoporous $CeO_2$ Nano- and Microstructures, Chem. Mater. 17(17):4514-4522, Jul. 22, 2005.

Abi-Aad, E., et al., Preparation and Characterization of $CeO_2$ Under an Oxidizing Atmosphere. Thermal Analysis, XPS, and EPR Study, Chem. Mater. (5):793-797, 1993.

Bock, C., et al., Size-Selected Synthesis of PtRu Nano-Catalysts: Reaction and Size Control Mechanism, J. Am. Chem. Soc. (126):8028-8037, 2004.

Cargnello, M., et al., Exceptional Activity for Methane Combustion Over Modular $Pd@CeO_2$Subunits on Functionalized $Al_2O_3$, Science (337):713-717, 2012.

Jiang, X., et al., Ethylene Glycol-Mediated Synthesis of Metal Oxide Nanowires, J. Mater. Chem. (14):695-703, 2004.

Kim, D.H., et al., the Role of Lanthanum Oxide on Pd-Only Three-Way Catalysts Prepared by Co-Impregnation and Sequential Impregnation Methods, Catalysis Letters (70):35-41, 2000.

Larcher, D., et al., Some Insights on the Use of Polyols-Based Metal Alkoxides Powders as Precursors for Tailored Metal-Oxides Particles, Chem. Mater. (15):3543-3551, 2003.

Padeste, C., et al., Thermal Decomposition of Pure and Rhodium Impregnated Cerium(III)Carbonate Hydrate in Different Atmospheres, Catalysis Letters (24):95-105, 1994.

Peuckert, M., XPS Study on Surface and Bulk Palladium Oxide, Its Thermal Stability, and a Comparison with Other Noble Metal Oxides, J. Phys. Chem. (89):2481-2486, 1985.

Priolkar, K.R., et al., Formation of $Ce_{1-x}Pd_xO_{2-ADDAC;Amo}$Solid Solution in Combustion-Synthesized Pd/CeO2 Catalyst: XRD, XPS, and EXAFS Investigation, Chem. Mater. (14):2120-2128, 2002.

Wang, Z.-L., et al., Pd/C Synthesized with Citric Acid: An Efficient Catalyst for Hydrogen Generation from Formic Acid/Sodium Formate, Scientific Reports (2):598, 2012, 6 pages.

Yang, J., and R.L. Frost, Synthesis and Characterisation of Cobalt Hydroxy Carbonate $CO_2CO_3(Oh)_2$Nanomaterials Spectrochimica Acta Part A: Molecular and Biomolecular Spectroscopy (78):420-428, 2011.

Zhong, L.-S., et al., In-Situ Loading of Noble Metal Nanoparticles on Hydroxyl-Group-Rich Titania Precursor and Their Catalytic Applications, Chem. Mater. (19):4557-4562, 2007.

\* cited by examiner

METHODS OF PREPARING METAL/METAL OXIDE MATERIALS FROM NANOSTRUCTURED SUBSTRATES AND USES THEREOF

INCORPORATION BY REFERENCE TO ANY PRIORITY APPLICATIONS

This application is the U.S. National Phase of International Application No. PCT/CA2015/000118, filed Feb. 25, 2015, designating the U.S. and claiming priority to U.S. Provisional Application No. 61/944,876, filed Feb. 26, 2014. Any and all applications for which a foreign or domestic priority claim is identified here or in the Application Data Sheet as filed with the present application are hereby incorporated by reference under 37 CFR 1.57.

TECHNICAL FIELD

This invention relates to nanostructures, their uses and methods of preparation thereof. In particular, the invention relates to methods of preparing metal/metal oxide materials from nanostructured substrates.

BACKGROUND

Natural gas offers a clean-energy alternative to gasoline and diesel as it produces less $CO_2$ per unit energy. However, the management of unburned methane from natural gas engines and industrial emissions is a growing concern as methane is a potent greenhouse gas with a global warming potential over 20 times greater than $CO_2$. Existing 3-way catalytic convertors currently used in vehicles are poor at oxidizing methane, but $Pd/CeO_2$ composite materials are able to oxidize methane efficiently. These are typically formed by wet impregnation methods, but other methods including co-precipitation, deposition-precipitation, specific adsorption, and combustion synthesis are known. These methods to prepare $Pd/CeO_2$ structures and other metal/metal oxide composites generally lead to ill-defined structures and relatively high catalytic initiation temperatures.

SUMMARY

This invention is based in part on the use of surface-assisted reduction to deposit a metal onto a reaction surface of a nanostructure or nanostructured substrate comprising a reducing agent.

In one aspect, the present disclosure provides a method of preparing a metal/metal oxide material. An embodiment of the method comprises providing a nanostructure, wherein the nanostructure comprises a first metal to form the metal oxide, and a reaction surface with a reducing agent on the reaction surface. An embodiment of the method further comprises depositing a second metal onto the reaction surface to form a bimetallic product and calcining the bimetallic product to form the metal/metal oxide material.

In various aspects, the reducing agent can be an organic reducing agent. For example, the reducing agent can be formate.

In various aspects, the nanostructure can be cerium formate. For example, the nanostructure can be cerium formate nanospheres.

In various aspects, the reducing agent can be bound to the reaction surface. In further embodiments, the reducing agent can form a surface layer on the reaction surface of the nanostructure.

In further embodiments, the nanostructure can be cerium hydroxycarbonate. For example, the nanostructure can be cerium hydroxycarbonate nanorods.

In various aspects, the second metal can form a layer on a surface of the bimetallic product.

In further embodiments, depositing the second metal onto the reaction surface comprises reacting a metal salt of the second metal with the nanostructure, wherein the metal salt comprises the second metal in oxidized form. In various aspects, the metal salt can be in aqueous solution. In accordance with another aspect, reacting the metal salt with the nanostructure can comprise reducing the second metal in oxidized form and oxidizing the reducing agent to form the bimetallic product. In another embodiment, oxidative by-products of the reducing agent can be on a surface of the bimetallic product. For example, the oxidative by-products of the reducing agent can comprise carbonate.

In various aspects, the metal/metal oxide material can be a catalyst. For example, the catalyst can be a methane oxidation catalyst. In various aspects, $T_{50}$ of the methane oxidation catalyst can be about 300° C. or less.

In further embodiments, the second metal deposited onto the reaction surface can be palladium. In various aspects, the metal salt can be $Pd(NO_3)_2$. In another embodiment, the second metal deposited onto the reaction surface can be gold, silver, platinum, copper, iron, lead, tin, nickel or cobalt.

In various aspects, providing the nanostructure comprises reacting a cerium-containing starting material with a solvent at a reaction temperature. In further embodiments, varying the reaction temperature changes the nano structure. In other embodiments, the solvent can be ethylene glycol. In various aspects, the cerium-containing starting material can be a cerium (III) starting material.

In various aspects, the metal oxide of the metal/metal oxide material can be cerium oxide.

In further embodiments, the nanostructure can be aluminum formate, tin formate, mixed metal formate or doped cerium formate.

In accordance with another embodiment, there is provided a metal/metal oxide material prepared by a surface-assisted reduction process. An embodiment of the process comprises providing a nanostructure, wherein the nanostructure comprises a first metal to form the metal oxide, and a reaction surface with a reducing agent on the reaction surface. An embodiment of the process further comprises depositing a second metal onto the reaction surface by reacting a metal salt with the nanostructure to form a bimetallic product and calcining the bimetallic product to form the metal/metal oxide material.

In various aspects, the reducing agent can be an organic reducing agent. For example, the reducing agent can be formate.

In various aspects, the nanostructure can be cerium formate. For example, the nanostructure can be cerium formate nanospheres.

In various aspects, the reducing agent can be bound to the reaction surface. In further embodiments, the reducing agent can form a surface layer on the reaction surface of the nanostructure.

In various aspects, the nanostructure can be cerium hydroxycarbonate. For example, the nanostructure can be cerium hydroxycarbonate nanorods.

In various aspects, the second metal can form a layer on a surface of the bimetallic product.

In further embodiments, the metal salt can comprise the second metal in oxidized form. In various aspects, the metal salt can be in aqueous solution.

In various embodiments, reacting the metal salt with the nanostructure comprises reducing the second metal in oxidized form and oxidizing the reducing agent to form the bimetallic product. In further embodiments, oxidative by-products of the reducing agent can be on a surface of the bimetallic product. For example, the oxidative by-products of the reducing agent comprise carbonate.

In various aspects, the metal/metal oxide material can be a catalyst. For example, the catalyst can be a methane oxidation catalyst. In further embodiments, $T_{50}$ of the methane oxidation catalyst can be about 300° C. or less.

In various aspects, the second metal deposited onto the reaction surface can be palladium. In another embodiment, the metal salt can be $Pd(NO_3)_2$. In various aspects, the second metal deposited onto the reaction surface can be gold, silver, platinum, copper, iron, lead, tin, nickel or cobalt.

In various embodiments, providing the nanostructure comprises reacting a cerium-containing starting material with a solvent at a reaction temperature. In further embodiments, varying the reaction temperature changes the nanostructure. In various aspects, the solvent can be ethylene glycol. In various aspects, the cerium-containing starting material can be a cerium (III) starting material.

In various aspects, the metal oxide of the metal/metal oxide material can be cerium oxide.

In various aspects, the nanostructure can be aluminum formate, tin formate, mixed metal formate or doped cerium formate.

In accordance with another embodiment, there is provided a method of preparing a cerium oxide material. An embodiment of the method comprises reacting a cerium-containing starting material with a solvent at a reaction temperature to form a nanostructure and calcining the nanostructure to form the cerium oxide material.

In various aspects, the cerium-containing starting material can be cerium (III) nitrate hexahydrate, cerium (III) chloride, cerium (III) acetylacetonate, cerium (III) acetate, cerium (III) 2-ethylhexanoate or cerium (III) oxalate.

In various aspects, the solvent can be ethylene glycol, diethylene glycol, any oligoethyleneoxide or any polyethyleneoxide.

In various aspects, the cerium-containing starting material can be cerium (III) nitrate hexahydrate and the solvent can be ethylene glycol. In further embodiments, the reaction temperature can be below about 393 K and the nanostructure can be $CeO_2$ nanospheres. In other embodiments, the reaction temperature can be between about 413 K and about 423 K and the nanostructure can be cerium formate nanospheres. In other embodiments, calcining the cerium formate nanospheres can form cerium oxide nanospheres as the cerium oxide material. In further embodiments, the reaction temperature can be between about 443 K and about 463 K and the nanostructure can be cerium hydroxycarbonate nanorods. In other embodiments, calcining the cerium hydroxycarbonate nanorods can form cerium oxide nanorods as the cerium oxide material. In further embodiments, the reaction temperature can be between about 473 K and about 493 K and the nanostructure can be cerium hydroxycarbonate nanoparticles with a sheet-like morphology.

Other aspects and features of the present invention will become apparent to those ordinarily skilled in the art upon review of the following description of specific embodiments of the invention in conjunction with the accompanying claims.

BRIEF DESCRIPTION OF THE DRAWINGS

In drawings which illustrate embodiments of the invention.

DETAILED DESCRIPTION

Any terms not directly defined herein shall be understood to have the meanings commonly associated with them as understood within the art of the invention.

The terms "nanostructure", "nanostructures" and "nanostructured" are used as they are normally understood to a person of ordinary skill in the art and often refer to materials, particles, structures or objects having at least one dimension that is between about 0.1 nm and about 100 nm. Examples of nanostructures or nanostructured materials include nanorods, nanospheres, nanoparticles, nanotextured surfaces, nanofibers, nanowires, nanoshells and nanorings.

The terms "$T_{50}$" and "$T_{100}$" are used as they are normally understood to a person of ordinary skill in the art and often refer to the temperature at which the conversion efficiency of a catalyst reaches approximately 50% and approximately 100%, respectively, under the specific conditions for the reaction.

Embodiments of the methods described herein are directed to the synthesis of nanostructures comprising a first metal and having a reducing agent on a reaction surface of the nanostructure. Metals can be deposited onto the reaction surface of these nanostructures through surface-assisted reduction to form a bimetallic product. Calcining the bimetallic product can result in the formation of metal/metal oxide materials, wherein the first metal forms the metal oxide. Some embodiments make use of the metal/metal oxide materials as catalytic solid-state materials. In accordance with further embodiments, the metal/metal oxide materials can be used in catalytic converters, CO oxidation, alkane oxidation, methane oxidation such as oxidizing methane from home furnaces or industrial methane scrubbing, chemical-mechanical planarization processes, or catalytic applications of palladium such as Sonogashira coupling, Heck coupling, Stille coupling, Suzuki coupling or the Leuckart reaction.

Figure 1:
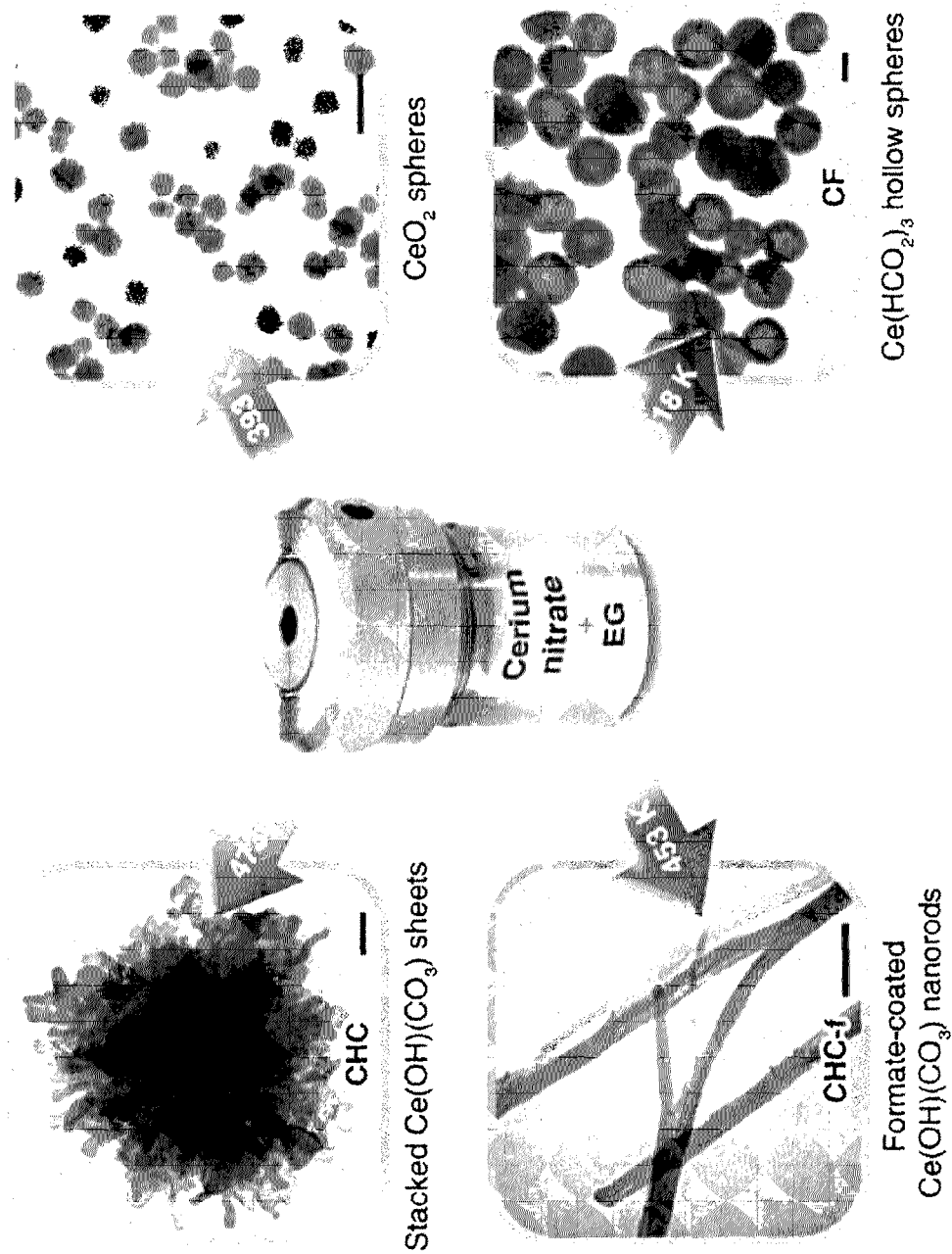
FIG. 1 shows a method of preparing cerium nanostructures by reacting cerium nitrate and ethylene glycol at various reaction temperatures. The scale bars in the transmission electron microscopy ("TEM") images correspond to 100 nm.

Referring to FIG. 1, a method according to a first embodiment of the invention is shown. Embodiments of the methods comprise the synthesis of a nanostructure or nanostructured substrate comprising a first metal to form the metal oxide and having a reaction surface, by the solvothermal reaction between a metal-containing starting material and a solvent at a reaction temperature. For example, the metal-containing starting material can be cerium nitrate and the solvent can be ethylene glycol ("EG"). EG is known to be a reducing agent that can be oxidized to aldehydes, acids and finally $CO_2$ (Bock, C.; Paquet, C.; Couillard, M.; Botton, G. A.; MacDougall, B. R. *J. Am. Chem. Soc.* 2004, 126, 8028-8037; Jiang, X.; Wang, Y.; Herricks, T.; Xia, Y. *J. Mat. Chem.* 2004, 14, 695-703). The reaction between cerium nitrate and EG can form cerium hydroxycarbonate, Ce(OH)$CO_3$ ("CHC"), or cerium formate, Ce(HCOO)$_3$ ("CF"), depending on the reaction temperature, as discussed in more detail below.

In some embodiments, solvents known to generate formic acid through thermal and/or chemical decomposition, such as diethylene glycol, any oligoethyleneoxide or any polyethyleneoxide, are used in the synthesis of the nanostructure or nanostructured substrate, including mixtures of solvents, such as ethanol/EG or water/EG. The metal-containing starting material can be a cerium-containing starting material. In various embodiments, the cerium-containing starting material can be any compound comprising cerium (III), such as cerium (III) nitrate hexahydrate, cerium (III) chloride, cerium (III) acetylacetonate, cerium (III) acetate, cerium (III) 2-ethylhexanoate, or cerium (III) oxalate, including their hydrates and solvates. In some embodiments, the cerium-containing starting material can be used with the addition of nitric acid.

Figure 2:
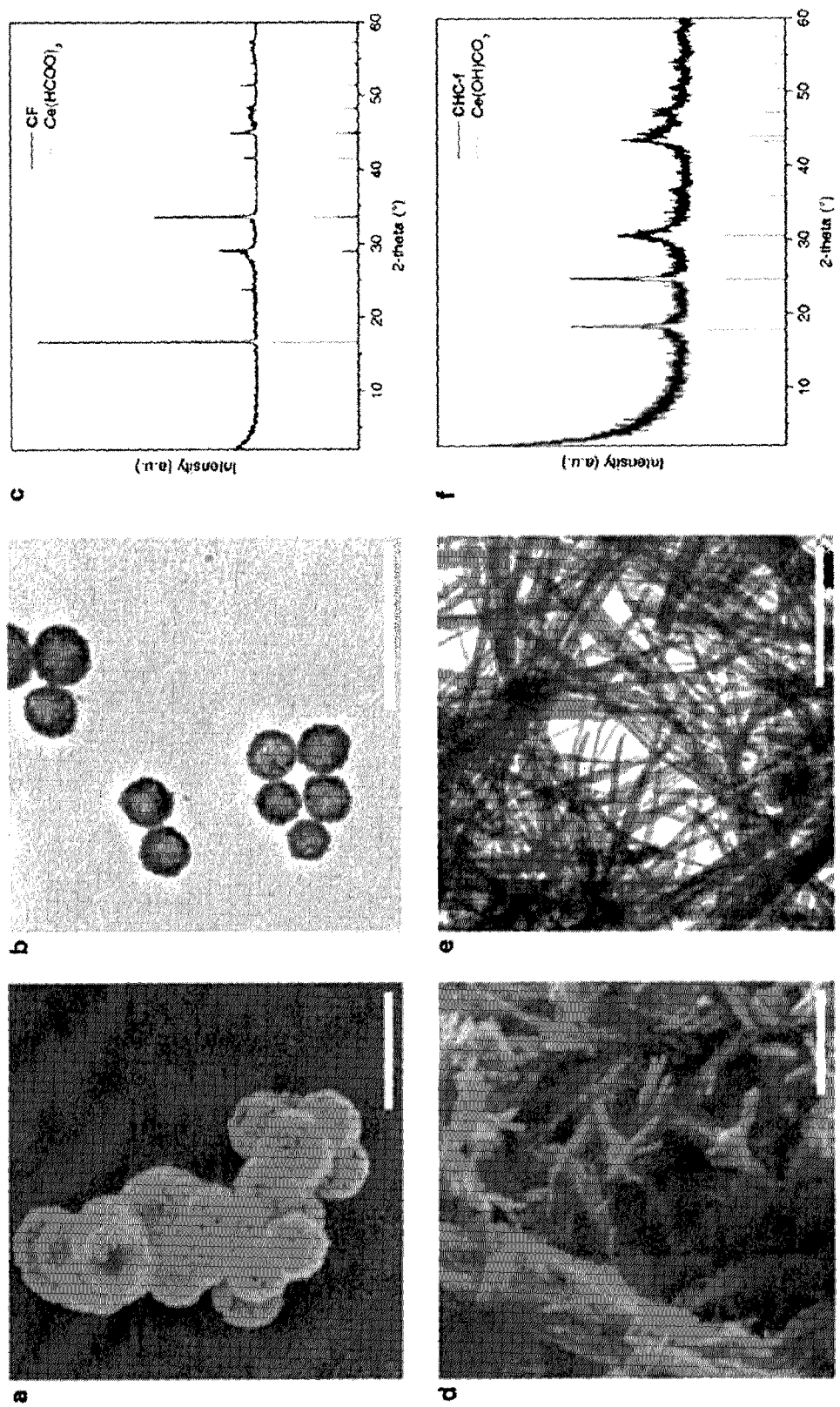
FIG. 2(a) shows a field-emission scanning electron microscopy ("FESEM") image of hollow cerium formate ("CF") nanospheres. The scale bar corresponds to 500 nm.
FIG. 2(b) shows a TEM image of hollow CF nanospheres. The scale bar corresponds to 500 nm.
FIG. 2(c) shows a powder X-ray diffraction ("PXRD") pattern of CF. The PXRD pattern matches that of cerium formate, JCPDS 49-1245.
FIG. 2(d) shows a FESEM image of cerium hydroxycarbonate ("CHC") nanorods coated with formate ("CHC-f"). The scale bar corresponds to 500 nm.
FIG. 2(e) shows a TEM image of CHC-f. The scale bar corresponds to 500 nm.
FIG. 2(f) shows a PXRD pattern of CHC-f, which matches JCPDS-52-0352.
Figure 3:
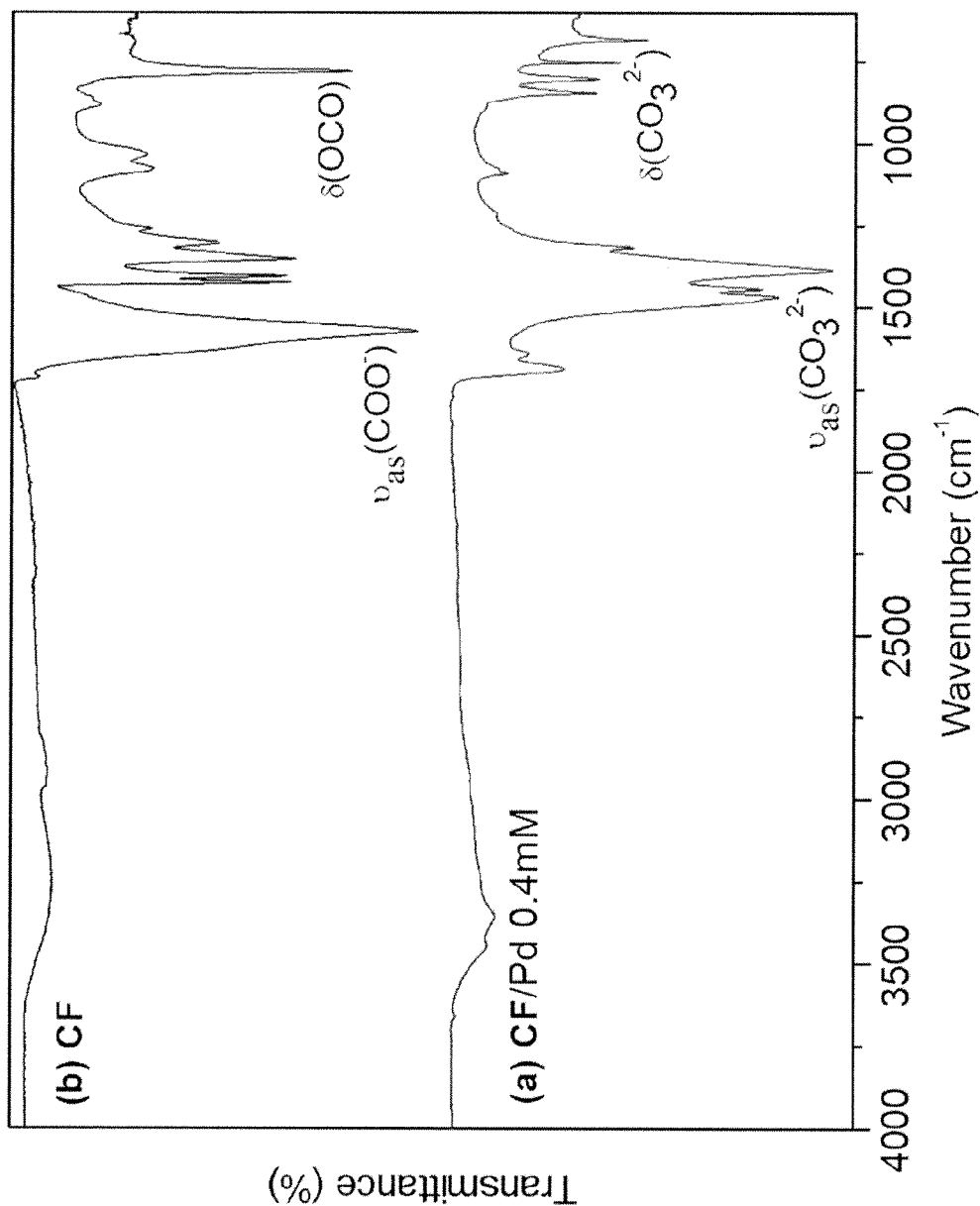
FIG. 3 shows Fourier transform infrared ("FTIR") spectra of (a) CF/Pd (0.4 mM); and (b) CF.

According to further embodiments, different nanostructures can be obtained by varying only the reaction temperature. For example, cerium nanostructures that incorporate CHC or CF can be formed. In accordance with one embodiment, cerium nitrate and EG reacted at temperatures below 393 K forms $CeO_2$ nanospheres. When the reaction is carried out at 418 K, CF nanospheres can be obtained (FIGS. 2(a)-(c)). Referring to FIG. 3(b), the FTIR spectrum of the CF nanospheres showed an intense band at 1570 $cm^{-1}$ that is characteristic of the asymmetric COO stretching mode and a band at 776 $cm^{-1}$ that arises from $\delta$ (OCO) of the formate group, along with the bands due to residual EG ($\sim$1040-1080 $cm^{-1}$).

Referring to FIGS. 2(d)-(f), reactions carried out at 453 K can result in a yellow gel consisting of CHC nanorods, as confirmed by electron micrographs and powder X-ray diffraction ("PXRD") patterns. X-ray photoelectron spectroscopy ("XPS") of CHC nanorods showed only the presence of cerium in oxidation state +3, as expected for CHC (Table 1). XPS of the CHC nanorods also showed an O 1s peak characteristic of hydroxycarbonates (Yang, J.; Cheng, H.; Frost, R. L. *Spectrochim. Acta A* 2011, 78, 420-428).

TABLE 1

XPS data for various CHC-based materials

| Sample | XPS Peaks (Ce) B.E (eV) | Oxidation state (Ce) | XPS Peaks (O) | Oxidation state (O) | XPS Peaks (Pd) | Oxidation state (Pd) |
| --- | --- | --- | --- | --- | --- | --- |
| CHC comprising a layer of formate on the reaction surface ("CHC-f") | 882.3, 885.7, 901.1, 904.7, | +3 | 531.8 | −2 | NA | NA |
| CHC-f treated with water | 882.4, 885.7, 901.3, 904.7 | +3 | 531.6 | −2 | NA | NA |
| CHC-f/$CeO_2$-nr | 883.5, 889.3, 898.7, 901.0, 909.0, 917.5, | +4 | 529.5, 531.5 | −2 | NA | NA |

TABLE 1-continued

XPS data for various CHC-based materials

| Sample | XPS Peaks (Ce) B.E (eV) | Oxidation state (Ce) | XPS Peaks (O) | Oxidation state (O) | XPS Peaks (Pd) | Oxidation state (Pd) |
|---|---|---|---|---|---|---|
| CHC-f/Pd (1 mM) | 882.5, 885.8, 900.8, 904.5, | +3 | 531.7 | −2 | 335.4, 340.5 | 0 |
| Pd—CeO$_2$ (CHC-f, 1 mM) | 883.5, 890.2, 898.7, 901.0, 908.5, 917.4 | +4 | 529.6, 531.2 | −2 | 337.0, 338.1, 342.4 | +2 |
| CeO$_2$-nr/Pd-MIWI | 882.7, 889.2, 898.6, 901.3, 907.6, 917.1 | +4 | 529.5, 531.5 | −2 | 337.9, 434.1 | +2 |

Notes:
Binding energy (B.E.) (eV) of Pd$^0$: 335.4, 340.2; Pd in PdO: 337.0, 342.3; Ce$^{3+}$ in Ce$_2$(CO$_3$)$_3$: 886.2, 904.7; Ce$^{4+}$ in CeO$_2$: 882.5, 888.7, 898.2, 900.7, 907.6, 916.5 (Abi-aad, E.; Bechara, R.; Grimblot, J.; Aboukais, A. *Chem. Mater.* 1993, 5, 793-797; Padeste, C.; Cant, N. W.; Trimm, D. L. *Catal. Lett.* 1994, 24, 95-105; Peuckert, M. *J. Phys. Chem.* 1985, 89, 2481-2486).

Figure 4:
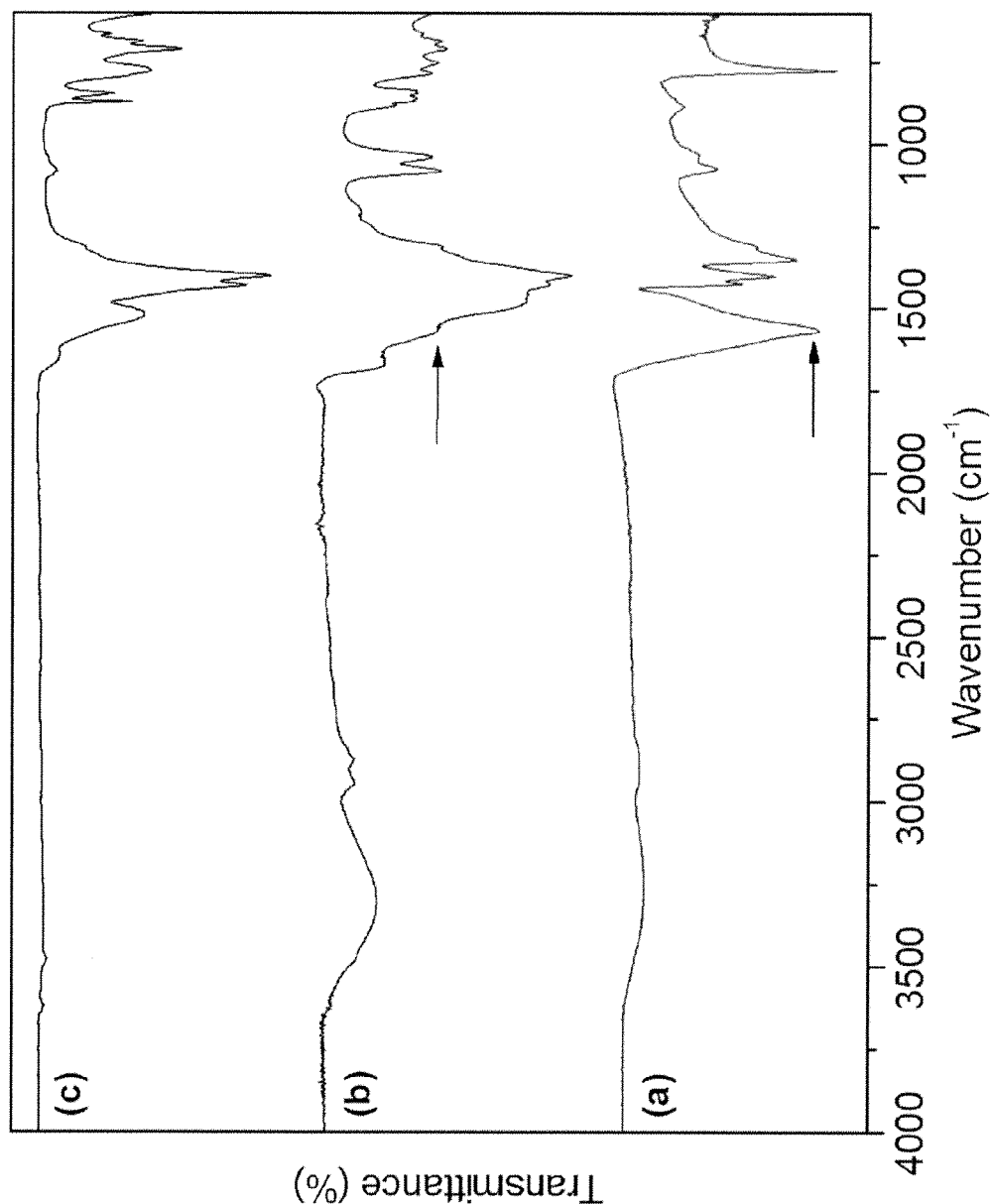
FIG. 4 shows FTIR spectra of (a) CF; (b) CHC synthesized at 453 K (CHC-f); and (c) CHC synthesized at 473 K. The arrows in (a) and (b) correspond to the formate C—O stretching frequency.

In further embodiments, the nanostructures comprise a reducing agent on the reaction surface of the nanostructures. In some embodiments, the reducing agent is an organic reducing agent. The reducing agent can be bound to the reaction surface of the nanostructures and can include residual solvent, solvent derivatives, or oxidative by-products of the solvent. In various embodiments, the reducing agent can form a surface layer on the reaction surface of the nanostructure. For example, FTIR spectroscopy of the CHC nanorods showed the presence of formate along with bands due to the hydroxycarbonate and residual EG (FIG. 4). Formic acid is a known decomposition product of EG, and the formate can coat the reaction surface of the CHC nanorods to form a distorted layer on the reaction surface of the nanorods. CHC nanorods comprising the surface layer of formate on the reaction surface are referred to as "CHC-f". In other embodiments, the nanostructure itself can act as the reducing agent. For example, in CF nanospheres, formate groups on or at the reaction surface of the nanospheres serve as the reducing agent and do not form a layer on the reaction surface, as in the case of CHC-f.

In further embodiments, other organic groups such as malonate, lactate, citrate and hydride can function as reducing agents.

CHC can also be formed above 473 K, but this material can have a sheet-like morphology and be more crystalline than the nanorods. IR spectroscopy showed that this product contained comparably less residual formate and EG than the CHC-f nanorods.

In accordance with various embodiments, the nanostructures can form metal oxide supports with retention of morphology upon calcination. For example, calcining CF at 673 K can result in hollow cerium oxide nanospheres ("CF/CeO$_2$-ns") and calcining CHC-f can result in cerium oxide nanorods ("CHC-f/CeO$_2$-nr").

According to a further embodiment, these metal oxide supports can be used as catalyst supports or substrates. For example, CF/CeO$_2$, CHC-f/CeO$_2$ and other cerium oxide supports can be used as supports for metal catalysts, including methane oxidation catalysts.

Figure 5:
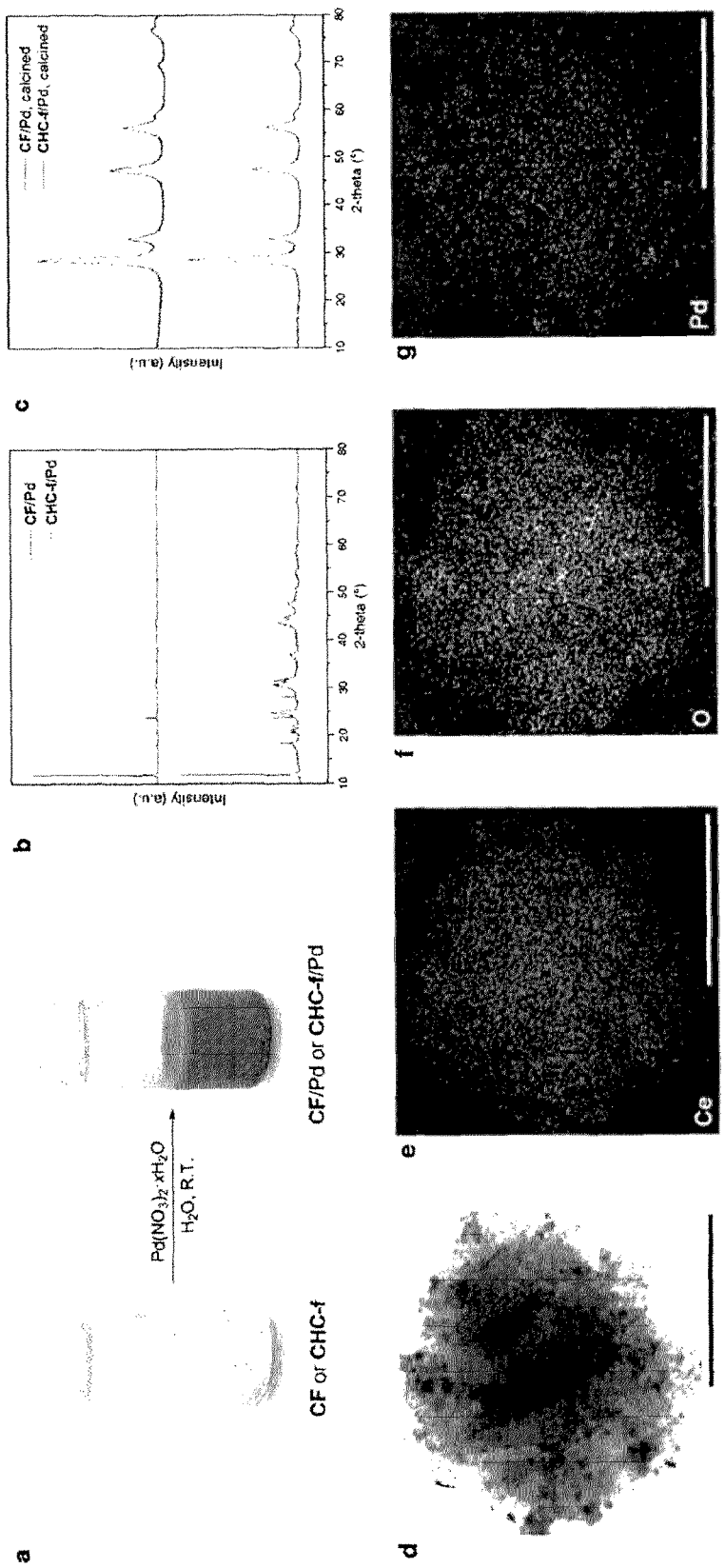
FIG. 5(a) shows a method of synthesizing CF/Pd (1 mM) or CHC-f/Pd (1 mM).
FIG. 5(b) shows PXRD patterns of CF/Pd (1 mM) and CHC-f/Pd (1 mM).
FIG. 5(c) shows PXRD patterns of Pd—$CeO_2$ (CF, 1 mM) and Pd—$CeO_2$ (CHC-f, 1 mM).
FIG. 5(d) shows the scanning transmission electron microscopy ("STEM") image of Pd—$CeO_2$ (CHC-f, 1 mM). The scale bar corresponds to 500 nm.
FIG. 5(e) shows the energy dispersive X-ray spectroscopy ("EDS") elemental map of Ce corresponding to the STEM image of FIG. 5(d). The scale bar corresponds to 500 nm.
FIG. 5(f) shows the EDS elemental map of 0 corresponding to the STEM image of FIG. 5(d). The scale bar corresponds to 500 nm.
FIG. 5(g) shows the EDS elemental map of Pd corresponding to the STEM image of FIG. 5(d). The scale bar corresponds to 500 nm.

In accordance with various embodiments, a second metal can be deposited onto the reaction surface of the nanostructure to form a bimetallic product. Referring to FIG. 5(*a*), a method according to a further embodiment is shown for the surface-assisted reduction reaction of the nanostructure comprising a first metal and having a reducing agent on the reaction surface with a metal salt of the second metal to form a bimetallic product. The metal salt can be in aqueous solution and can comprise the second metal in oxidized form. The reaction can involve the reduction of the second metal in oxidized form and oxidation of the reducing agent. The reducing agent can allow for the deposition of the second metal onto the reaction surface, giving well dispersed metals on a surface of the bimetallic product. Oxidative by-products of the reducing agent can also be found on the surface of the bimetallic product. As opposed to other materials in which the metal ions are attached or anchored to a precursor by physical capillary forces, embodiments of the methods described herein comprise a chemical reaction between the metal salt and the reducing agent. This can allow for improved interaction between the second metal and nanostructure and improved dispersion of the second metal on the surface of the bimetallic product. The bimetallic products can be described through a common nomenclature which identifies the nanostructure and the second metal deposited onto the reaction surface thereof as follows:

a/b which designates a material composed of nanostructure "a" and second metal deposited onto the reaction surface thereof "b". For example, addition of either CHC-f or CF to solutions of Pd(NO$_3$)$_2$ yields black precipitates, indicating a reduction of Pd$^{2+}$ to Pd$^0$ to form CHC-f/Pd or CF/Pd, respectively. Without being bound by any particular theory, it appears that the formate may be responsible for the reduction of Pd$^{2+}$ as sodium formate has been reported as an efficient reducing agent in the synthesis of palladium nanoparticles (Wang, Z.-L.; Yan, J.-M.; Wang, H.-L.; Ping, Y.; Jiang, Q. *Sci. Rep.* 2012, 2, 598; Zhong, L.-S.; Hu, J.-S.; Cui, Z.-M.; Wan, L.-J.; Song, W.-G. *Chem. Mater.* 2007, 19, 4557-4562).

In one embodiment, the rate of reaction correlates with the relative proportion of reducing agent present on the reaction surface of the nanostructure. For example, the rate of reaction of formate groups present on the reaction surface of CHC-f or CF with Pd(NO$_3$)$_2$ correlates with the relative proportion of formate groups present on the reaction surface. The rate of reaction of CF with Pd(NO$_3$)$_2$ can be faster than the rate of reaction of CHC with Pd(NO$_3$)$_2$. In one embodiment, the reaction can be completed in about five minutes or less. In another embodiment, the reaction can be completed in about one hour or less. In a further embodiment, the reaction can be completed in about 12 hours or less.

In various embodiments, by-products of the oxidation of the reducing agent can be found on the surface of the bimetallic product. For example, the FTIR spectrum of CF and CF/Pd (FIG. 3) showed that after surface-assisted reduction, the characteristic peaks of formate (1570 and 776 cm$^{-1}$) disappear and new peaks characteristic of carbonate appear (1385 and 847 cm$^{-1}$) as the formate upon oxidation gives rise to carbonate.

Figure 6:
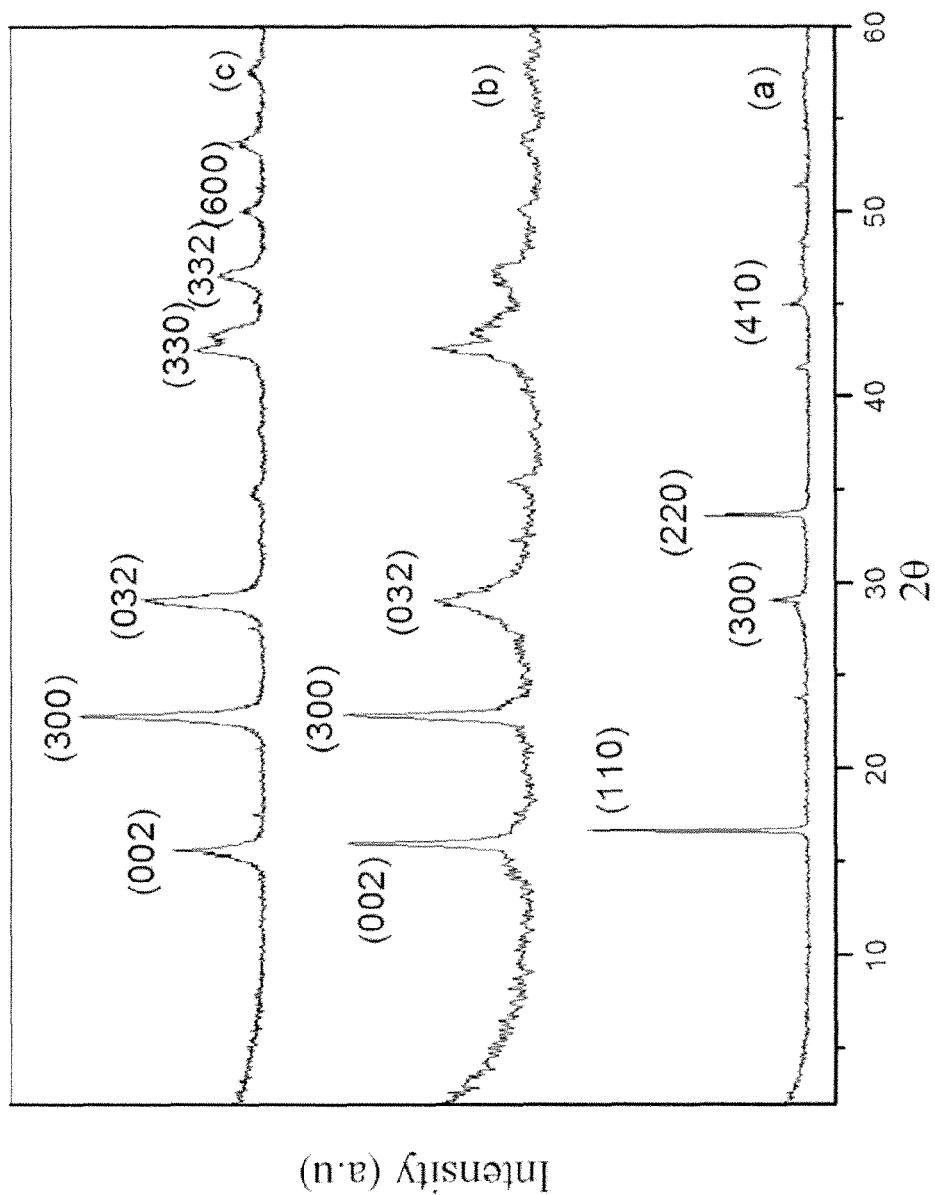
FIG. 6 shows the PXRD patterns of (a) CF; (b) CHC synthesized at 453 K (CHC-f); and (c) CHC synthesized at 473 K (CHC).

In other embodiments, the reduced second metal can form a layered structure on the surface of the bimetallic product. Referring to FIG. 6, the PXRD pattern of CHC-f/Pd and CF/Pd were all dominated by low angle reflections at 2θ=11.7, 23.4 and 35, and did not show reflections due to palladium. The PXRD patterns did not have sufficient peaks to index to a unit cell, but they had characteristic patterns that are similar to layered metal-oxygen structures (Larcher, D.; Sudant, G.; Patrice, R.; Tarascon, J. M. *Chem. Mater.* 2003, 15, 3543-3551, Zhong, L.-S.; Hu, J.-S.; Cao, A.-M.; Liu, Q.; Song, W.-G.; Wan, L.-J. *Chem. Mater.* 2007, 19, 1648-1655). In the case of CHC-f/Pd, the PXRD pattern of the sample showed reflections of both hydroxycarbonate and the lamellar structure. CHC-f stirred in water for 12 h without added Pd(NO$_3$)$_2$ was also transformed into the same crystalline structure. When CF or CHC prepared above 473 K was treated with water there was no indication of formation of the layered structure. Without being bound by any particular theory, it appears that carbonate and residual EG may facilitate the transformation of the nanostructures into layered bimetallic products in water. When the as-synthesized CF is stirred with water, it has residual EG on its reaction surface which forms the layered structure but lacks carbonate. On the other hand, CHC synthesized at 473 K has sufficient carbonate but no residual EG, and does not form the layered structure, as corroborated by FTIR data (FIG. 4(*c*)). Thus, the formation of the layered structure may occur in water when both carbonate and some residual EG are present in the reaction mixture.

In various embodiments, the surface-assisted reduction reaction can involve the oxidation of the reducing agent on the reaction surface of the nanostructure. High resolution XPS spectra of the Ce 3D region of CHC-f after water treatment and CHC-f/Pd are both similar to the XPS spectra of as-synthesized CF, confirming that neither the water treatment nor the reaction with palladium nitrate resulted in the oxidation of Ce$^{3+}$ to Ce$^{4+}$ (Table 1). This showed that the reduction of palladium involves the formate groups and the Ce$^{3+}$ does not act as reducing agent. High resolution XPS data of CHC-f/Pd showed the presence of Pd$^0$ (Kim, D. H.; Woo, S. I.; Lee, J. M.; Yang, O.-B. *Catal. Lett.* 2000, 70, 35-41; Priolkar, K. R.; Bera, P.; Sarode, P. R.; Hegde, M. S.; Emura, S.; Kumashiro, R.; Lalla, N. P. *Chem. Mater.* 2002, 14, 2120-2128). For comparison, CF was prepared by reacting cerium chloride with formic acid in ethanol. This cerium formate also reduced palladium nitrate. However, the PXRD pattern of the product obtained did not have peaks due to palladium or its compounds. There was also no indication of the formation of the layered structure. The material appeared to be a mixture of CF and cerium carbonate, which supports the conclusion that formate takes part in the reduction, yielding carbonate as a by-product. Since there was no EG present in the reaction, the product obtained was cerium carbonate, not the layered structure.

Figure 11:
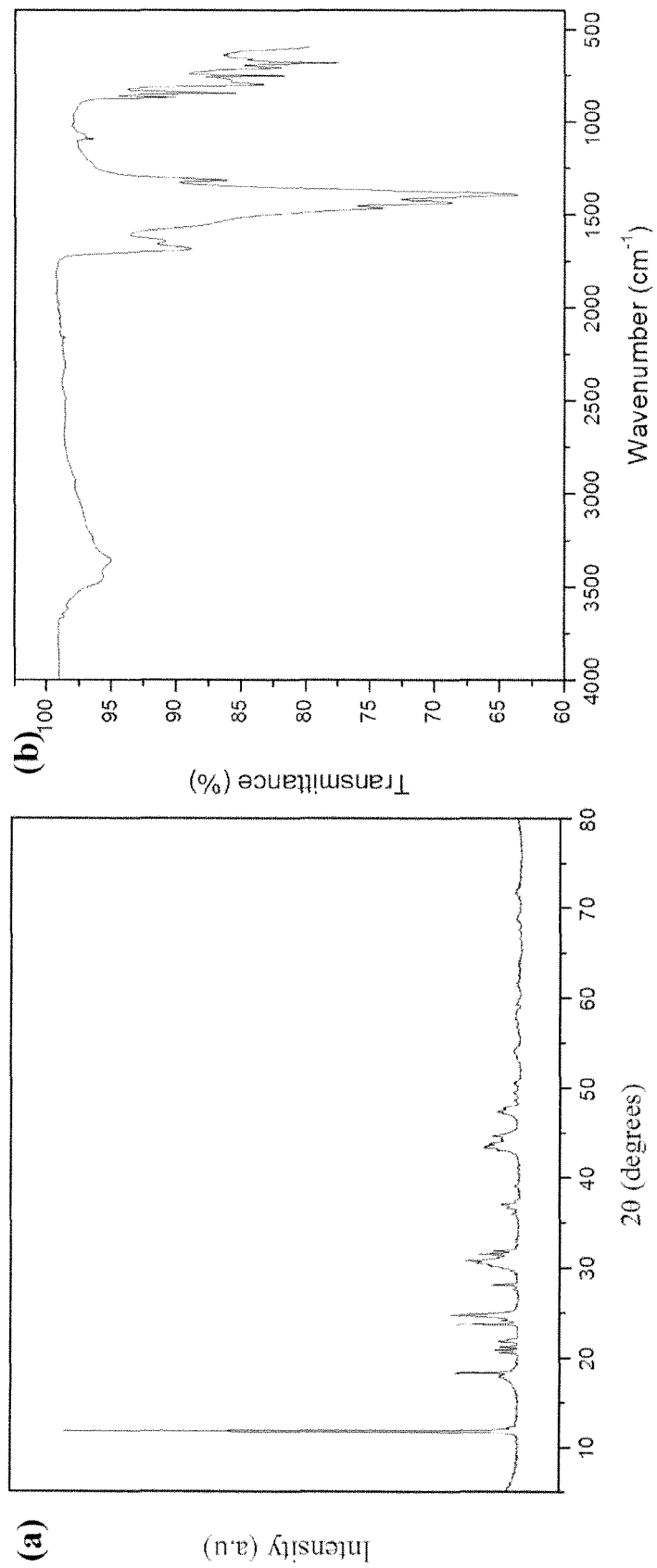
FIG. 11(a) shows the PXRD pattern of CHC-f/Au (1 mM).
FIG. 11(b) shows the FTIR spectrum of CHC-f/Au (1 mM).

In further embodiments, metals other than palladium can be deposited onto the reaction surface of the nanostructure. For example, gold or silver can be deposited onto the reaction surface of the nanostructure by the reaction of gold (III) or silver (I) salts with CHC-f or CF in water. The surface-assisted reduction of auric chloride hydrate with CHC-f results in a colour change in solution from yellow to purple, indicating a reduction of Au$^{3+}$ to Au$^0$ to form CHC-f/Au while reduction of silver nitrate with CF resulted in a change from a colourless to black solution indicating a reduction from Ag$^+$ to Ag$^0$. The PXRD pattern of CHC-f/Au, shown in FIG. 11(*a*), is similar to that of CHC-f/Pd with the formation of a layered structure along with the reflections due to CHC. Referring to FIG. 11(*b*), the FTIR spectrum of CHC-f/Au showed that the formate bands disappeared and the bands due to carbonate ions appeared, confirming that the formate ion was used up in the surface-assisted reduction of auric chloride hydrate. In accordance with various embodiments, other metals, such as platinum, copper, iron, lead, tin, nickel or cobalt, can be deposited onto the reaction surface of the nanostructure, provided that the metal can be reduced by the reducing agent on the reaction surface of the nanostructure. For example, any metal ion with a reduction potential greater than that of the reducing agent can be deposited onto the reaction surface of the nanostructure to form the bimetallic product.

In accordance with further embodiments, monobasic aluminum formate can also mediate the surface-assisted reduction of palladium nitrate to yield an Al$_2$O$_3$/Pd material. CeO$_2$/Al$_2$O$_3$/Pd materials have also been synthesized by incorporating CF in the pores of high surface area aluminum oxide followed by surface-assisted reduction of palladium nitrate by CF and thermolysis.

Other nanostructures according to various embodiments described herein can include aluminum formate, tin formate, mixed metal formates or doped cerium formate.

In other embodiments, the bimetallic product can be calcined to form a metal/metal oxide material. The metal/metal oxide materials can be described through a common nomenclature which identifies the metal oxide, the second metal, the nanostructure from which the metal/metal oxide was prepared, and a concentration of the metal salt used for the surface-assisted reduction reaction to prepare the bimetallic product, as follows:

x-y (nanostructure, z mM)

which designates "x" as the second metal, "y" as the metal oxide and "z mM" as the concentration of the metal salt used for the surface-assisted reduction reaction to prepare the bimetallic product.

Figure 7:
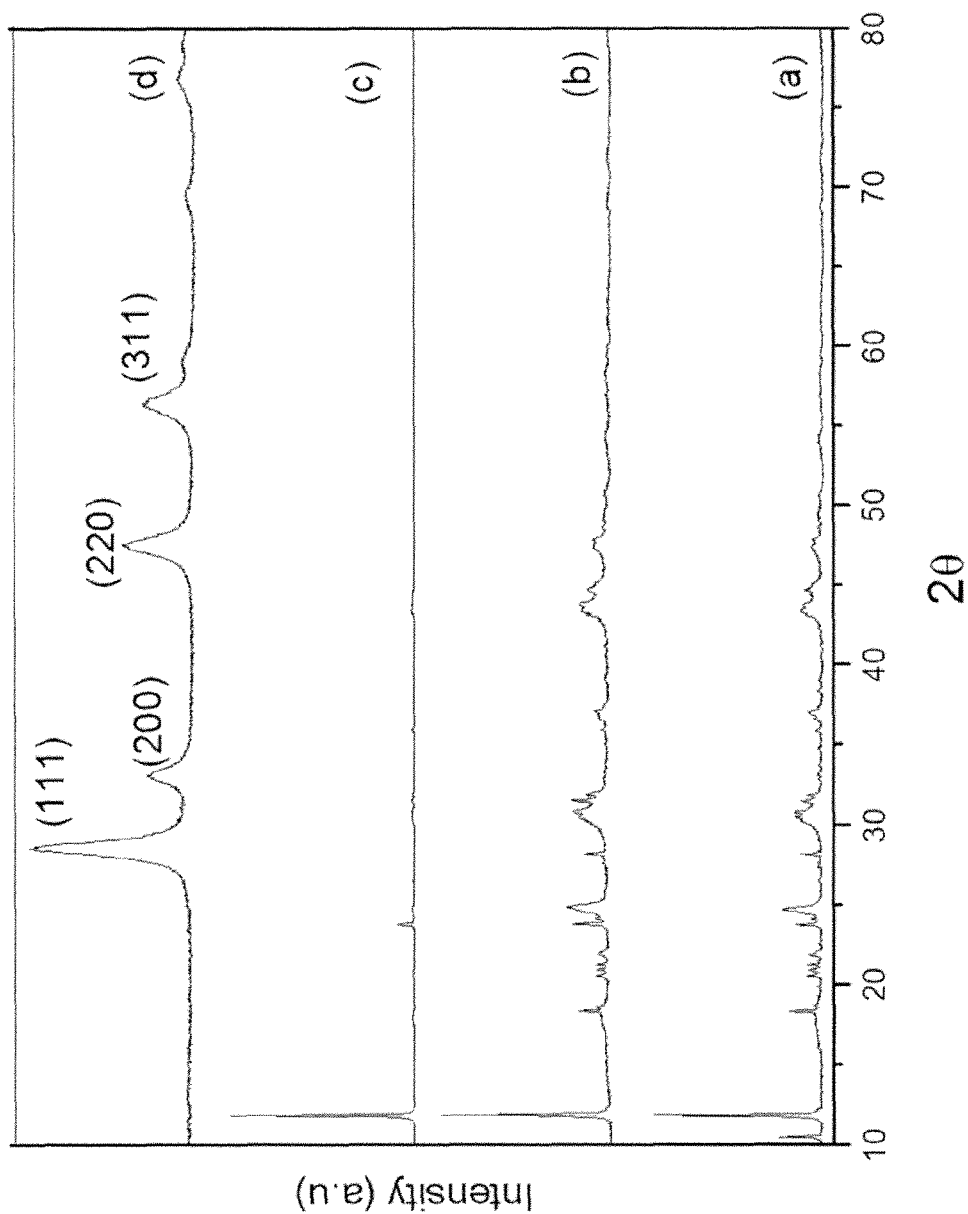
FIG. 7 shows the PXRD patterns of (a) CHC-f treated with water; (b) CHC-f/Pd (1 mM); (c) CF/Pd (2 mM); and (d) Pd—$CeO_2$ (CHC-f, 1 mM).
Figure 8:
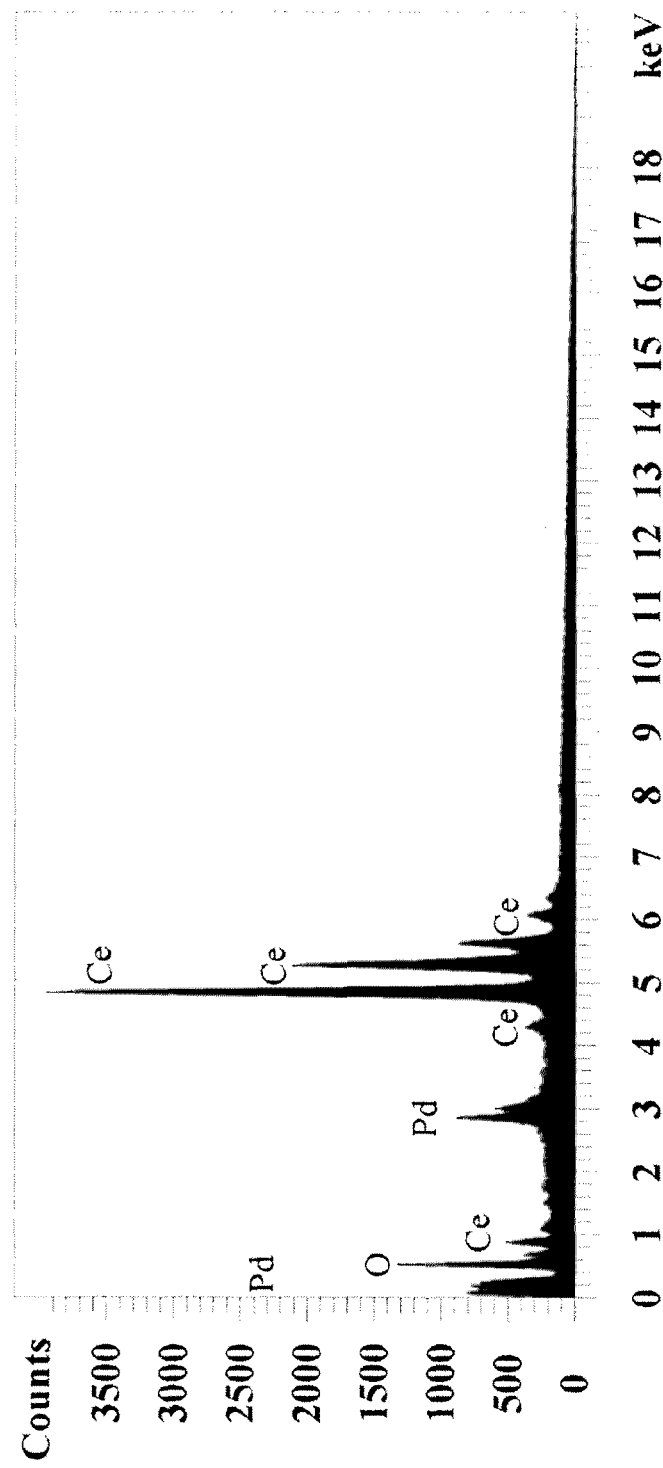
FIG. 8 shows the EDS spectrum of Pd—$CeO_2$ (CHC-f, 1 mM).

In one embodiment, CHC-f/Pd can be calcined at 673 K to prepare a 1 wt % Pd—CeO$_2$ material (denoted "Pd—CeO$_2$ (CHC-f, 1 mM)"). Referring to FIG. 7, the PXRD pattern of Pd—CeO$_2$ (CHC-f, 1 mM) was indexed to cubic CeO$_2$, and no peaks for Pd or PdO were observed. Referring to FIG. 5, energy dispersive X-ray spectroscopy ("EDS") data (elemental maps of Ce, O and Pd) showed that the palladium was well dispersed in the ceria matrix. Referring to FIG. 8, the EDS spectrum of Pd—CeO$_2$ (CHC-f, 1 mM) showed the presence of both Ce and Pd. Referring to FIG. 5(*d*), TEM images of Pd—CeO$_2$ (CHC-f, 1 mM) showed that after calcination, the material had lost the nanofibrillar morphology of CHC-f/Pd (FIG. 2(*e*)). XPS data of Pd—CeO$_2$ (CHC-f, 1 mM) showed Ce$^{4+}$ and the O 1s XPS data were similar to CeO$_2$ (Table 1). The high resolution Pd 3d XPS spectrum of Pd—CeO$_2$ (CHC-f, 1 mM) calcined at 673 K showed that most of the palladium was present as PdO (B.E.=337 eV). A small contribution from a second peak with a higher B.E.=338.1 eV was also present. The higher B.E. value indicates a more ionic form of palladium; this has been reported to arise because of the interaction of palladium with the cerium oxide matrix (Priolkar, K. R.; Bera, P.; Sarode, P. R.; Hegde, M. S.; Emura, S.; Kumashiro, R.; Lalla, N. P. *Chem. Mater.* 2002, 14, 2120-2128). In the Pd—CeO$_2$ materials prepared according to the methods described herein, the palladium can exist as palladium oxide with some palladium exhibiting ionic character from the interaction with cerium oxide.

In further embodiments, the metal/metal oxide materials can be used as catalysts. In various embodiments, the catalyst can be a methane oxidation catalyst. The catalytic activities of the metal/metal oxide materials were measured by passing methane and oxygen over a bed of the material and detecting the products formed by mass spectrometry. To compare the effect of ceria nanostructures, bulk ceria was prepared by the traditional precipitation method ("ceria-p"). For comparison, 1% Pd-loaded reference samples were prepared by the modified incipient wet impregnation ("MIWI") technique (Table 1). The samples prepared from various ceria nanostructures and palladium nitrate by MIWI were denoted as "ceria-x/Pd-MIWI" wherein x="nr" for nanorods, "ns" for nanospheres, and "p" for precipitate, after calcination. The Pd—$CeO_2$ catalysts prepared by in situ formate reduction of palladium nitrate with nanostructures followed by calcination are denoted as indicated in Table 2.

TABLE 2

Synthesis of Pd—$CeO_2$ catalysts by in situ formate reduction based on palladium nitrate concentration

| Sample | Cerium precursor | Palladium nitrate concentration (mM) |
| --- | --- | --- |
| Pd—$CeO_2$ (CHC-f, 2 mM) | CHC-f | 2 |
| Pd—$CeO_2$ (CHC-f, 1 mM) | CHC-f | 1 |
| Pd—$CeO_2$ (CF, 1 mM) | CF | 1 |
| Pd—$CeO_2$ (CF, 0.4 mM) | CF | 0.4 |
| Pd—$CeO_2$ (CF, 0.3 mM) | CF | 0.3 |

Notes:
Palladium loading of the final catalysts amounted to 1 wt %. This was confirmed for Pd—$CeO_2$ (CHC-f, 1 mM) by inductively coupled plasma mass spectrometry ("ICP-MS") as 1.07%.

Figure 9:
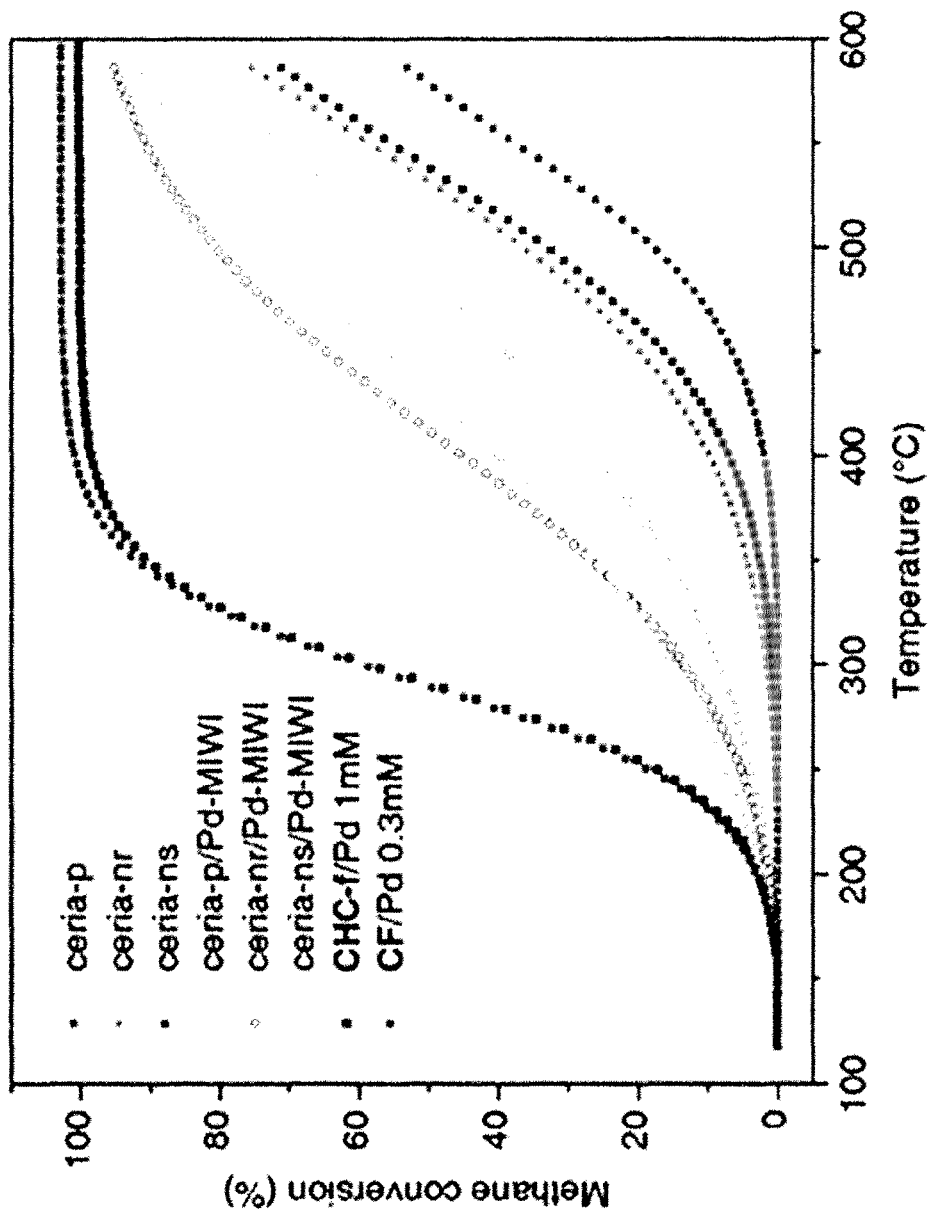
FIG. 9 shows methane conversion (%) as a function of temperature for various catalysts. Reaction conditions: 1000 ppmv $CH_4$ in 20% $O_2$ (balance He and Ar), GHSV~180000 $h^{-1}$.

The temperature profiles for methane conversion using Pd—$CeO_2$ (CHC-f, 1 mM), Pd—$CeO_2$ (CF, 0.3 mM) and control catalyst samples prepared by MIWI are shown in FIG. 9. Pd—$CeO_2$ (CHC-f, 1 mM) and Pd—$CeO_2$ (CF, 0.3 mM) showed excellent activity with $T_{50}$ for the materials well below about 300° C. and a $T_{100}$ of about 400° C. By comparison, the other ceria-x/Pd-MIWI samples examined had $T_{50}$ greater than about 400° C. and complete conversion was not achieved even at about 600° C. Significantly, Pd—$CeO_2$ (CHC-f, 1 mM) and Pd—$CeO_2$ (CF, 0.3 mM) exhibited substantially better activity than the samples prepared by the MIWI method. These materials also showed better activity than other prior art Pd—$CeO_2$ catalyst systems (Colussi, S.; Gayen, A.; Farnesi Camellone, M.; Boaro, M.; Llorca, J.; Fabris, S.; Trovarelli, A. *Angew. Chem. Int. Ed.* 2009, 48, 8481-8484; Cargnello, M.; Jaén, J. J. D.; Garrido, J. C. H.; Bakhmutsky, K.; Montini, T.; Gárnez, J. J. C.; Gorte, R. J.; Fornasiero, P. *Science* 2012, 337, 713-717).

Figure 10:
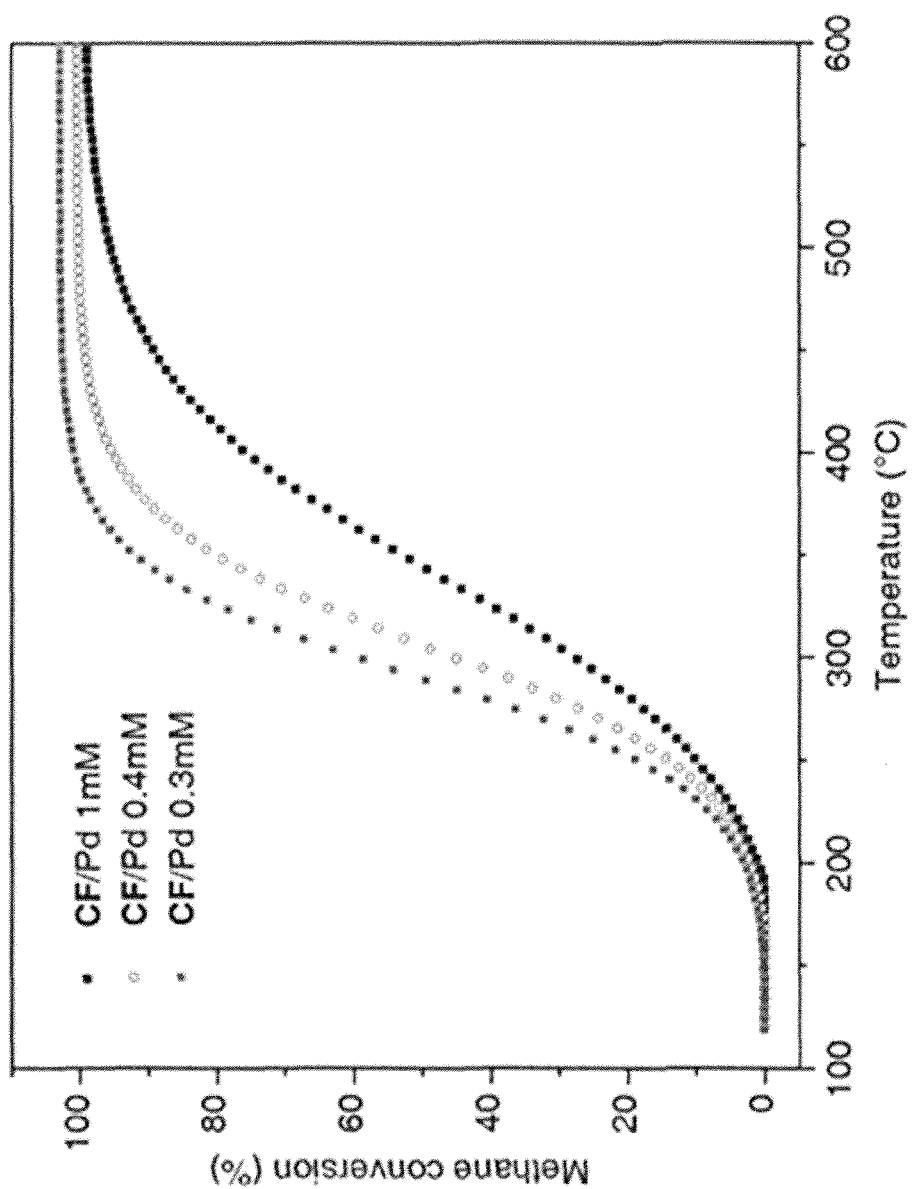
FIG. 10 shows methane conversion (%) as a function of temperature for Pd—$CeO_2$ (CF, 1 mM), Pd—$CeO_2$ (CF, 0.4 mM) and Pd—$CeO_2$ (CF, 0.3 mM). The Pd loading of the final metal/metal oxide hybrid material was adjusted to be 1 wt. %. Reaction conditions: 1000 ppmv $CH_4$ in 20% $O_2$ (balance He and Ar), GHSV 180000 $h^{-1}$.

In a further embodiment, the dispersion of the second metal on the reaction surface of the nanostructure can depend on the reduction reaction conditions and the nanostructure, resulting in differing catalytic activities of the resulting catalysts. Referring to FIG. 10, the catalytic efficiency of the Pd—$CeO_2$ catalysts prepared by varying the palladium nitrate concentration in the surface-assisted reduction of $Pd^{2+}$ by CF was compared. When CF was used as the nanostructure, the catalytic activity of the resulting catalysts increased as the palladium source was diluted. The catalytic activity of Pd—$CeO_2$ (CF, 0.3 mM) was greater than that of Pd—$CeO_2$ (CF, 0.4 mM) which in turn was greater than Pd—$CeO_2$ (CF, 1 mM). Without being bound by any particular theory, the reaction with diluted palladium nitrate may result in slower reduction and thereby slower nucleation of $Pd^0$. Since no external capping agents are required to be used in the methods described herein, slower reduction leads to less aggregation and better dispersion of $Pd^0$. This may increase the number of catalytic sites accessible to methane and improve the redox interaction between the Pd and ceria.

Various alternative embodiments and examples of the invention are described herein. These embodiments and examples are illustrative and should not be construed as limiting the scope of the invention.

General Methodologies

Characterization

Powder X-ray diffraction ("PXRD") data were recorded on a Bruker D8 Advance X-ray diffractometer in the Bragg-Brentano configuration, using Cu Kα radiation at 40 kV, 40 mA. FTIR spectra were recorded on powdered solids on a Nicolet 4700 spectrometer (Thermo Scientific). Field emission scanning electron microscopy ("FESEM") images were taken on a Hitachi S-4700 microscope. Samples were prepared by drop-casting the product dispersed in ethanol onto an Al stub then coating with gold for better resolution. Transmission electron microscopy ("TEM") images were collected on a Hitachi H7600 electron microscope operating at an accelerating voltage of 100 kV. X-ray photoelectron spectroscopy ("XPS") was carried out on a Leybold Max200 spectrometer using an aluminum Kα X-ray source (Al Kα=1486.6 eV) and operating at a base pressure of $1 \times 10^{-9}$ Torr. Initial survey scans were acquired with a pass energy of 192 eV, while higher resolution scans were acquired with a pass energy of 48 eV. Gas adsorption studies were performed using a Micromeritics Accelerated Surface Area & Porosity (ASAP) 2000 system.

Methane Oxidation Testing

The experimental setup for catalyst testing consisted of a stainless steel fixed bed reactor (Length: 5 cm; I.D.: 0.9 cm) located inside an electric tube furnace with a PID temperature controller. Two thermocouples (K-type) inserted inside the reactor measured the temperature at the top and bottom of the catalyst bed. The reactor was connected to a feed gas system that included electric mass flow controllers (Brooks 5850 TR) and a pump (Gilson 307), able to provide desired feed mixtures ($CH_4$, $O_2$, $CO_2$, Ar, and He) at a total flowrate of 300 $cm^3$ (STP) $min^{-1}$. There was a pre-heater in the gas flow line before the reactor to heat the reactants to 393 K. The gas flow lines connecting the pre-heater, the reactor and the quadrupole mass spectrometer were held at the same temperature as the pre-heater (393 K) using heating tape. After the reactant gas was fed to the reactor, the reactor temperature was increased linearly at 5 K $min^{-1}$ from 393 K to 873 K. Analysis of reactants and products was performed by a VG ProLab quadrupole mass spectrometer ("MS") that continuously monitored the reactor exit gas line. The MS detected and recorded the intensity of mass peaks corresponding to $CH_4$, $O_2$, $CO_2$, Ar, and He. A mixture of these gases was used to calibrate the MS and hence the concentrations of gases at the exit of the reactor were determined. Due to the difficulty in quantifying the water content of the exit stream by MS, water content was determined using the stoichiometry of the reactions.

EXAMPLES

Example 1: Synthesis of Rod-Like Cerium Hydroxycarbonate ("CHC-f")

Cerium nitrate hexahydrate (0.87 g, 0.002 mol) was added to ethylene glycol ("EG") (15 mL) in a 23 mL Teflon lined stainless steel autoclave. The sealed reaction mixture was maintained at 453 K in a hot air oven for 48 h and was then left to cool to room temperature. The product, a pale yellow gel, was isolated by centrifugation at 4500 rpm for 10 min, washed with ethanol (3×20 mL), and dried at 323 K. The PXRD pattern of the tan colored product matched the pattern of cerium hydroxycarbonate (JCPDS-52-0352). Key peaks in FTIR spectrum: modes of $CO_3^{2-}$: 1480, 1401, 1080, 864, 841 cm$^{-1}$. Reaction temperatures of about 443-463 K afforded CHC-f nanostructures.

Example 2: Synthesis of Hollow Sphere Cerium Formate ("CF")

Cerium nitrate hexahydrate (0.87 g, 0.002 mol) was added to EG (15 mL) in a 23 mL Teflon lined stainless steel autoclave. The sealed reaction vessel was heated at 418 K for 15 h. The resulting violet product was isolated by centrifugation at 4500 rpm for 10 min and washed with ethanol (3×20 mL) and dried overnight at 323 K to give a pale violet powder. The PXRD pattern of the product matched that of cerium formate (JCPDS 49-1245). Key peaks in FTIR spectrum: 1570, 1401, 1349, 776 cm$^{-1}$. Reaction temperatures of about 413-423 K afforded CF hollow nanospheres.

Example 3: Synthesis of Sheet-Like Cerium Hydroxycarbonate ("CHC")

Cerium nitrate hexahydrate (0.87 g, 0.002 mol) was added to EG (15 mL) in a 23 mL Teflon lined stainless steel autoclave. The sealed reaction vessel was heated at 473 K for 24 h. The resulting product was isolated by centrifugation at 4500 rpm for 10 min and washed with ethanol (3×20 mL) and dried overnight at 323 K. The white solid gave a PXRD pattern of cerium hydroxycarbonate (JCPDS-52-0352). Key peaks in FTIR spectrum: 1521, 1430, 1403, 1082, 871, 847 cm$^{-1}$. Reaction temperatures of about 473-493 K afforded CHC with a sheet-like structure.

Example 4: Synthesis of Metal Oxide Supports

The nanostructures were heated to either 673 or 1073 K for 3 h in a muffle furnace.

Example 5: Synthesis of Pd—$CeO_2$ Materials by MIWI

Ceria-Pd catalysts were prepared by a modified incipient wetness impregnation ("MIWI") method. Ceria (200 mg) and the appropriate amount of palladium nitrate (1 wt % (4.3 mg) and 10 wt % (48 mg) of Pd) in aqueous suspension (10 mL of distilled water) were stirred overnight. The solution was heated at 353 K for 12 h until the water was completely evaporated. The catalyst was subsequently calcined at 673 K under air.

Example 6: Synthesis of Pd—$CeO_2$ (Cerium Nanostructure, z mM) by Surface-Assisted Reduction of Palladium Nitrate In a typical reaction, calculated quantities of the nanostructure were added to the appropriate amount of palladium nitrate dissolved in distilled water (Table 3). The solution was stirred at room temperature for 12 h. The solid was centrifuged at 3000 rpm, washed with water and dried at 333 K overnight. The powder was calcined at 673 K to give Pd—$CeO_2$ (cerium nanostructure, z mM). Key peaks in FTIR spectrum of Pd—$CeO_2$ (CF, 0.4 mM): 1469, 1444, 1386, 1089, 848 cm$^{-1}$. The Pd-ceria catalyst obtained by the calcination of Pd—$CeO_2$ (CF, 0.4 mM) at 673 K had BET surface area of 90 m$^2$/g.

TABLE 3

Quantities of reagents used in the surface-assisted reduction reactions described in Example 6

| Sample | Cerium precursor | Mass of $Pd(NO_3)_2$ used (mg) | Volume of $H_2O$ (mL) |
|---|---|---|---|
| Pd—$CeO_2$ (CHC-f, 2 mM) | CHC-f | 4.3 | 10 |
| Pd—$CeO_2$ (CHC-f, 2 mM) | CHC-f | 4.3 | 20 |
| Pd—$CeO_2$ (CF, 1 mM) | CF | 4.3 | 20 |
| Pd—$CeO_2$ (CF, 0.4 mM) | CF | 4.3 | 50 |
| Pd—$CeO_2$ (CF, 0.3 mM) | CF | 4.3 | 70 |

Note:
Palladium loading of the final material amounted to 1 wt %.

Example 7: Synthesis of Au—$CeO_2$ (CHC-f, 1 mM) by Surface-Assisted Reduction of Auric Chloride In a typical synthesis, calculated quantities of nanostructure were added to the appropriate amount of auric chloride hydrate in distilled water, which resulted in a purple solution indicating the reduction of $Au^{3+}$ to $Au^0$. The solution was stirred overnight at room temperature. The solid was centrifuged at 3000 rpm, washed with water and dried at 333 K overnight. The powder was calcined at 673 K to give Au—$CeO_2$ (CHC-f, 1 mM). Key peaks in FTIR spectrum of CHC-f/Au (1 mM): 1466, 1437, 1395, 1091, 847 cm$^{-1}$.

Example 8: Synthesis of Monobasic Aluminum Formate

Aluminum-tri-sec-butoxide was dissolved in water to which formic acid was added and the solution was kept at 373 K to evaporate water. After drying at 373 K, monobasic aluminum formate was obtained as white powder.

Example 9: Surface Modification of High Surface Area ("HSA") Aluminum Oxide to Synthesize Formate Modified Alumina 1 g of commercial HSA aluminum oxide was stirred with 1% (v/v) aqueous formic acid for 3 h. The product was washed with water to remove the excess formic acid and dried at 373 K to give formate modified alumina.

Example 10: Synthesis of CF/HSA Aluminum Oxide

HSA aluminum oxide pellets were ball milled to give fine powder. 500 mg of HSA alumina was degassed under vacuum at 373 K for 3 h and then cooled down to room temperature. Cerium nitrate (900 mg) was dissolved in 5 mL of ethanol and added to the alumina under vacuum at room temperature and maintained at the same conditions for 3 h. After 3 h, the gel-like product was slowly heated to 373 K under vacuum to result in while solid. The white solid was transferred to a Teflon lined autoclave, 15 mL of EG was added, and the autoclave was sealed. The autoclave was maintained 453 K for 48 h. The product obtained was washed with ethanol and dried overnight at 323 K.

Example 11: Synthesis of Pd—Al$_2$O$_3$ Materials by Surface-Assisted Reduction of Palladium Nitrate In a typical reaction, calculated quantities of monobasic aluminum formate or formate modified alumina were added to the appropriate amount of palladium nitrate dissolved in distilled water. The solution was kept undisturbed at room temperature for 12 h. The resulting black solution, which indicates the reduction of palladium nitrate, was kept at 323 K for 3 days to evaporate water. The black powder obtained was calcined at 673 K for 3 h to give Pd—Al$_2$O$_3$ materials.

Example 12: Synthesis of Pd—CeO$_2$/Al$_2$O$_3$ Materials by Surface-Assisted Reduction of Palladium Nitrate In a typical reaction, calculated quantities of CF/HSA alumina oxide were added to the appropriate amount of palladium nitrate dissolved in distilled water. The solution was kept undisturbed at room temperature for 12 h. The resulting black solution was kept at 323 K for 3 days to evaporate water. The product obtained was calcined at 673 K for 3 h to give Pd—CeO$_2$/Al$_2$O$_3$.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as any open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing.

Citation of references herein is not an admission that such references are prior art to the present invention nor does it constitute any admission as to the contents or date of these documents.

What is claimed is:

1. A method of preparing a metal/metal oxide material, the method comprising:
   contacting a nanostructure, wherein the nanostructure comprises (i) a first metal including aluminum or cerium and (ii) a surface comprising a reducing agent, with a metal salt of a second metal;
   reducing the metal salt with the reducing agent to deposit the second metal onto the surface to form a bimetallic product, wherein the reducing agent is formate; and
   calcining the bimetallic product to form the metal/metal oxide material, wherein the first metal forms the metal oxide.

2. The method according to claim 1 wherein the nanostructure comprises aluminum formate, tin formate, mixed metal formate, cerium formate, doped cerium formate or cerium formate nanospheres.

3. The method according to claim 1 wherein the reducing agent is bound to the surface of the nanostructure.

4. The method according to claim 3 wherein the reducing agent forms a layer on the surface of the nanostructure.

5. The method according to claim 3 wherein the nanostructure is cerium hydroxycarbonate or cerium hydroxycarbonate nanorods.

6. The method according to claim 1 wherein the second metal forms a layer on a surface of the bimetallic product.

7. The method according to claim 6 wherein the second metal of the metal salt is in an oxidized form before said reducing.

8. The method according to claim 7 wherein the metal salt is in aqueous solution.

9. The method according to claim 7 wherein said reducing the metal salt is reducing the in the oxidized form of the metal salt and oxidizing the reducing agent to form the bimetallic product.

10. The method according to claim 9 wherein oxidative by-products of the reducing agent are on the surface of the bimetallic product.

11. The method according to claim 10 wherein the oxidative by-products of the reducing agent comprise carbonate.

12. The method according to claim 1 wherein the metal/metal oxide material is a methane oxidation catalyst.

13. The method according to claim 12 wherein T$_{50}$ of the methane oxidation catalyst is about 300° C. or less.

14. The method according to claim 1 wherein the second metal deposited onto the reaction surface is palladium, gold, silver, platinum, copper, iron, lead, tin, nickel, or cobalt.

15. The method according to claim 1 further comprising, prior to contacting the nanostructure with the metal salt, contacting a cerium-containing starting material with a solvent to form the nanostructure.

16. The method according to claim 15 wherein the solvent is ethylene glycol.

17. The method according to claim 15 wherein the cerium-containing starting material is a cerium (III) starting material.

18. The method according to claim 1 wherein the metal oxide of the metal/metal oxide material is cerium oxide.

* * * * *